(12) United States Patent
Ogihara et al.

(10) Patent No.: US 8,932,758 B2
(45) Date of Patent: *Jan. 13, 2015

(54) ELECTRODE ACTIVE MATERIAL, NONAQUEOUS SECONDARY BATTERY ELECTRODE, AND NONAQUEOUS SECONDARY BATTERY

(71) Applicant: Kabushiki Kaisha Toyota Chuo Kenkyusho, Nagakute-shi, Aichi-ken (JP)

(72) Inventors: Nobuhiro Ogihara, Nagakute (JP); Takao Inoue, Nagakute (JP)

(73) Assignee: Kabushiki Kaisha Toyota Chuo Kenkyusho, Nagakute-shi (JP)

( * ) Notice: Subject to any disclaimer, the term of this patent is extended or adjusted under 35 U.S.C. 154(b) by 14 days.

This patent is subject to a terminal disclaimer.

(21) Appl. No.: 13/856,776

(22) Filed: Apr. 4, 2013

(65) Prior Publication Data

US 2013/0280604 A1 Oct. 24, 2013

(30) Foreign Application Priority Data

Apr. 20, 2012 (JP) .................. 2012-096854

(51) Int. Cl.
*H01M 4/13* (2010.01)
*H01M 4/36* (2006.01)
(Continued)

(52) U.S. Cl.
CPC .............. *H01M 4/366* (2013.01); *H01M 4/606* (2013.01); *H01M 4/381* (2013.01); *Y02T 10/7011* (2013.01); *Y02E 60/122* (2013.01)
USPC ........................................ 429/218.1; 429/213

(58) Field of Classification Search
CPC ...... H01M 4/366; H01M 4/381; H01M 4/606

USPC .......................................................... 429/211
See application file for complete search history.

(56) References Cited

U.S. PATENT DOCUMENTS 5,529,859 A  6/1996  Shu et al.
7,476,463 B2  1/2009  Desilvestro et al.
(Continued)

FOREIGN PATENT DOCUMENTS

JP   A-2004-111374   4/2004
JP   A-2004-342605   12/2004
(Continued)

OTHER PUBLICATIONS

Banerjee et al., "Lithium Based Metal—Organic Framework with Exceptional Stability," Crystal Growth & Design, vol. 9, No. 5, pp. 2500-2503, 2009.

(Continued)

*Primary Examiner* — Ula C. Ruddock
*Assistant Examiner* — Lisa S Park Gehrke
(74) *Attorney, Agent, or Firm* — Oliff PLC

(57) ABSTRACT

An electrode active material of the present invention is made of a layered composition including organic backbone layers containing an aromatic compound that is a dicarboxylic acid anion having a naphthalene backbone; and alkali metal element layers containing an alkali metal element coordinated to oxygen contained in the carboxylic acid anion to form a backbone. The layered composition has an interplanar spacing between (002) planes of 0.42400 to 0.42800 nm, an interplanar spacing between (102) planes of 0.37000 to 0.37600 nm, an interplanar spacing between (211) planes of 0.32250 to 0.32650 nm, and an interplanar spacing between (112) planes of 0.30400 to 0.30700 nm, as measured by X-ray diffraction. Preferably, the layered composition has an interplanar spacing between (200) planes of 0.50500 to 0.50950 nm as measured by X-ray diffraction.

11 Claims, 13 Drawing Sheets

(51) Int. Cl.
  *H01M 4/60* (2006.01)
  *H01M 4/38* (2006.01)

(56) References Cited

U.S. PATENT DOCUMENTS

| | | | |
|---|---|---|---|
| 8,758,938 B2 * | 6/2014 | Ogihara | 429/218.1 |
| 2007/0065719 A1 | 3/2007 | Timonov et al. | |
| 2007/0292760 A1 | 12/2007 | Patoux et al. | |
| 2008/0090149 A1 | 4/2008 | Sano et al. | |
| 2010/0233534 A1 | 9/2010 | Iwama et al. | |
| 2011/0287317 A1 | 11/2011 | Nakanishi | |

FOREIGN PATENT DOCUMENTS

| | | |
|---|---|---|
| JP | A-2007-508709 | 4/2007 |
| JP | A-2008-287976 | 11/2008 |
| JP | A-2009-021229 | 1/2009 |
| JP | A-2009-037868 | 2/2009 |
| JP | A-2009-187940 | 8/2009 |
| JP | A-2010-113870 | 5/2010 |
| JP | A-2010-118320 | 5/2010 |
| WO | WO 2005/036572 A1 | 4/2005 |

OTHER PUBLICATIONS

Armand et al., "Conjugated Dicarboxylate Anodes for Li-Ion Batteries," Nature Materials, vol. 8, pp. 120-125, Feb. 2009.
Banerjee et al., "Recent Advances in s-Block Metal Carboxylate Networks," Crystal Growth & Design, vol. 11, pp. 4704-4720, 2011.
Kaduk, "Terephthalate Salts: Salts of Monopositive Cations," Acta Cryst., vol. B56, pp. 474-485, 2000.
Banerjee et al., "Synthesis and Structural Characterization of Lithium-Based Metal-Organic Frameworks," Crystal Growth & Design, vol. 9, pp. 4922-4926, 2009.
Aug. 16, 2013 Office Action issued in U.S. Appl. No. 13/814,703.
Aug. 27, 2013 Office Action issued in U.S. Appl. No. 13/439,377.
Jan. 2, 2014 Office Action issued in U.S. Appl. No. 13/439,377.
Jan. 3, 2014 Office Action issued in U.S. Appl. No. 13/814,703.
Jan. 17, 2012 Search Report issued in International Patent Application No. PCT/JP2011/074054 (with translation).
Armand, M. et al., "Conjugated dicarboxylate anodes for Li-ion batteries," Nature Materials, Feb. 2009, vol. 8, pp. 120-125.
P.L. Taberna et al., "High rate capabilities $Fe_3O_4$-based Cu nano-architectured electrodes for lithium-ion battery applications," Nature Materials, vol. 5, Jul. 2006, pp. 567-573.
Bing Sun et al., "MnO/C core-shell nanorods as high capacity anode materials for lithium-ion batteries," Journal of Power Sources, vol. 196, 2011, pp. 3346-3349.
Mao-Sung Wu et al., "Electrochemically deposited nanowires of manganese oxide as an anode material for lithium-ion batteries," Electrochemistry Communications, vol. 8, 2006, pp. 383-388.
U.S. Appl. No. 13/439,377 in the name of Ogihara, filed Apr. 4, 2012.
U.S. Appl. No. 13/814,703 in the name of Ogihara, filed Feb. 6, 2013.

* cited by examiner

ELECTRODE ACTIVE MATERIAL, NONAQUEOUS SECONDARY BATTERY ELECTRODE, AND NONAQUEOUS SECONDARY BATTERY

BACKGROUND OF THE INVENTION

1. Field of the Invention

The present invention relates to electrode active materials, nonaqueous secondary battery electrodes, and nonaqueous secondary batteries.

2. Description of the Related Art

Recently, the widespread use of hybrid cars, which can be driven by the energy of both gasoline and electricity, and devices requiring power supplies, such as uninterruptible power supplies, mobile communications devices, and portable electronic devices, has created an enormous need for improvements in the performance of rechargeable storage devices used therefor as power supplies. Specifically, there is a need for improved properties such as increased power, capacity, and cycle life.

To provide storage devices with such properties, research has been directed to the use of organic compounds as electrode active materials. Recently, organic compounds having a π-electron conjugated cloud have been suggested as novel active materials capable of absorbing and releasing lithium, which has the potential for high-speed charge and discharge (see, for example, Patent Documents 1 and 2). Also suggested is a lithium-dicarboxylate containing conjugated organic active material having an organic backbone composed of dilithium trans-muconate or dilithium terephthalate (see, for example, Non-Patent Document 1). This active material is characterized in that its organic backbone has a conjugated structure, which allows oxidation and reduction (absorption and release of lithium).

Also suggested are negative electrodes based on the conversion reaction of a metal oxide (e.g., MOx, where M is Fe, Co, Ni, Cu, Mn, or the like) such as manganese oxide or iron oxide (see, for example, Non-Patent Documents 2 to 4). These negative electrodes are charged and discharged by the reaction formula $MOx + xe^- + 2xLi^+ \rightarrow M + xLi_2O$.

[Patent Document 1] JP 2004-111374 A
[Patent Document 2] JP 2004-342605 A
[Non-Patent Document 1] Nature Materials, Vol. 8, 120-125 (2009)
[Non-Patent Document 2] Nature Materials, Vol. 5, 567-573 (2006)
[Non-Patent Document 3] J. Power Sources, 196, 3346-3349 (2011)
[Non-Patent Document 4] Electrochem. Commu., 8, 383-388 (2006)

SUMMARY OF THE INVENTION

The batteries in Patent Documents 1 and 2 described above, however, operate at a potential of 2.8 to 3.7 V with respect to lithium metal, meaning that they have insufficient energy densities. The battery in Non-Patent Document 1 has a conjugated structure that allows absorption and release of lithium, although the charge-discharge capacity thereof is insufficient, and there is a need for improved charge-discharge properties. Typical negative electrode materials used for lithium batteries are currently carbon materials such as graphite, which allow a redox reaction to occur at about 50 mV with respect to metallic lithium. This potential is close to that of metallic lithium, and there is a need for a secondary battery that has a sufficiently higher potential than lithium metal and that can itself operate at a higher voltage.

For negative electrodes based on conversion reaction, the lithium absorption reaction, which corresponds to the charge reaction at the negative electrode, occurs at a potential of 0.5 to 1.0 V with respect to metallic lithium, although the lithium release potential, which corresponds to the discharge reaction at the negative electrode, occurs at a potential of 1.5 to 2.0 V with respect to metallic lithium; thus, the negative electrode is considerably polarized. When used as a negative electrode, therefore, electrodes based on conversion reaction cause a problem in that the battery voltage drops during discharge.

In view of the foregoing problems, a primary object of the present invention is to provide electrode active materials with improved charge-discharge properties, nonaqueous secondary battery electrodes, and nonaqueous secondary batteries.

After conducting extensive research in order to achieve the above object, the inventors have found that a composition prepared using an aromatic compound that is a dicarboxylic acid anion by allowing lithium to coordinate to oxygen contained in the carboxylic acid and modifying the crystal structure thereof has improved charge-discharge properties with chemical stability, thus completing the present invention.

An electrode active material comprises a layered composition including: organic backbone layers containing an aromatic compound that is a dicarboxylic acid anion having two or more aromatic ring structures; and alkali metal element layers containing an alkali metal element coordinated to oxygen contained in the carboxylic acid anion to form a backbone, wherein the aromatic compound contained in the organic backbone layers has a naphthalene backbone, and wherein the layered composition has an interplanar spacing between (002) planes of 0.42400 to 0.42800 nm, an interplanar spacing between (102) planes of 0.37000 to 0.37600 nm, an interplanar spacing between (211) planes of 0.32250 to 0.32650 nm, and an interplanar spacing between (112) planes of 0.30400 to 0.30700 nm, as measured by X-ray diffraction.

A nonaqueous secondary battery electrode of the present invention includes the electrode active material described above.

A nonaqueous secondary battery of the present invention includes the nonaqueous secondary battery electrode described above and the ion-conducting medium that conducts alkali metal ions.

The electrode active material, nonaqueous secondary battery electrode, and nonaqueous secondary battery of the present invention provide improved charge-discharge properties. Although not fully understood, it is believed that this advantage is provided for the following reason. For example, the layered composition, serving as an active material, has four coordination bonds between the oxygen in the dicarboxylic acid and the alkali metal element (e.g., lithium), which presumably makes it insoluble in the nonaqueous electrolyte solution to maintain its crystal structure, thus improving the stability of the charge-discharge cyclability. In the layered composition, the organic backbone layers presumably function as redox sites, whereas the alkali metal element layers presumably function as alkali-metal-ion absorbing sites responsible for charge and discharge. In addition, for example, in the case of a negative electrode active material for a nonaqueous secondary battery that uses lithium ions, the electrode of the present invention has a charge-discharge potential of 0.5 to 1.0 V with respect to lithium metal, which prevents a significant decrease in energy density due to a decrease in the operating voltage of the battery and also prevents precipitation of lithium metal around 0 V with respect to lithium metal. This novel layered composition (crystalline organic-inorganic composite material) presumably improves the charge-discharge properties.

Furthermore, because the layered composition has a structure whose interplanar spacings, measured by X-ray diffraction, between planes such as (002) planes, (102) planes, (211) planes, and (112) planes fall within the preferred ranges, it probably increases the π-electron interaction of the aromatic compound, thus allowing exchange of more electrons. In addition, the layered composition presumably has fewer defects in the alkali metal element layers, which are made of an alkali metal and oxygen, and thus allows exchange of more ions, which increases the performance as an electrode active material. This presumably improves the capacity density and the charge-discharge cycling stability and thus improves the charge-discharge properties.

DESCRIPTION OF THE PREFERRED EMBODIMENTS

A nonaqueous secondary battery of the present invention includes a positive electrode containing a positive electrode active material that absorbs and releases an alkali metal, a negative electrode containing a negative electrode active material that absorbs and releases the alkali metal, and an ion-conducting medium that is disposed between the positive electrode and the negative electrode and that conducts alkali ions. At least one of the positive and negative electrodes of the nonaqueous secondary battery of the present invention contains a layered composition of the present invention as an electrode active material. The layered composition of the present invention includes organic backbone layers containing an aromatic compound that is a dicarboxylic acid anion having two or more aromatic ring structures and alkali metal element layers containing an alkali metal element coordinated to oxygen contained in the carboxylic acid anion to form a backbone. The layered composition of the present invention is preferably a negative electrode active material. In addition, the alkali metal contained in the alkali metal element layers may be, for example, one or more of Li, Na, K, and the like, preferably Li. In addition, the alkali metal that is absorbed and released during charge and discharge may be the same as or different from the alkali metal element contained in the alkali metal element layers, for example, one or more of Li, Na, K, and the like. As an electrode active material, a layered composition used as a negative electrode active material and including organic backbone layers containing an aromatic compound having a naphthalene backbone and alkali metal element layers containing Li will be mainly described. As a nonaqueous secondary battery, additionally, a nonaqueous secondary battery that uses the layered composition as a negative electrode active material and Li as an alkali metal that is absorbed and released during charge and discharge will be mainly described below.

Figure 1:
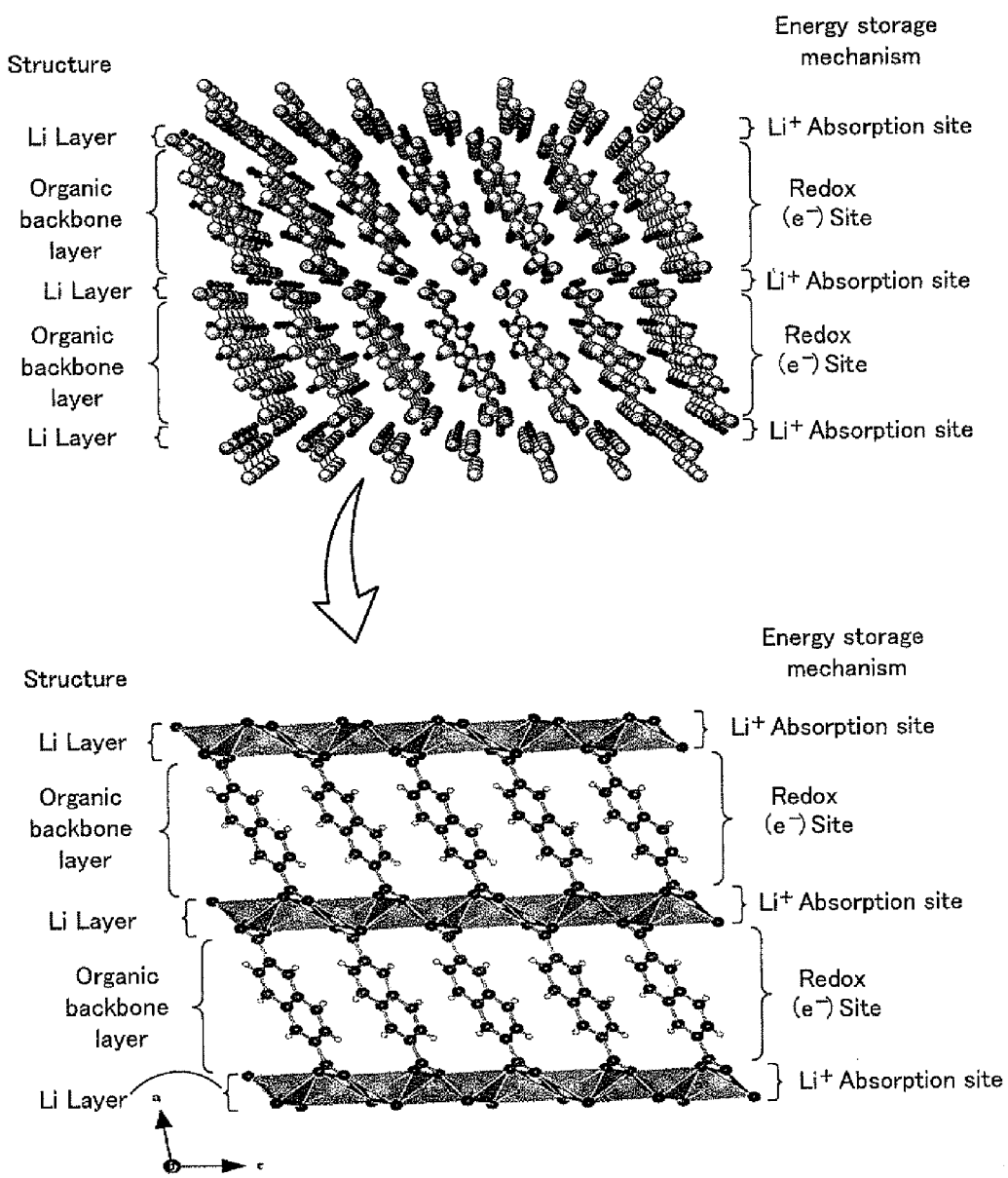
FIG. 1 is an illustration showing an example of the structure of a layered composition of the present invention.

The electrode active material of the present invention is made of a layered composition including organic backbone layers containing an aromatic compound that is a dicarboxylic acid anion having a naphthalene backbone structure and alkali metal element layers containing an alkali metal element coordinated to oxygen contained in the carboxylic acid anion to form a backbone. FIG. 1 is an illustration showing an example of the structure of the layered composition of the present invention. For higher structural stability, the layered composition is preferably formed in layers by π-electron interaction of the aromatic compound and has a monoclinic crystal structure belonging to the space group $P2_1/c$. For higher structural stability, additionally, the layered composition preferably has a structure of formula (1), where four oxygen atoms from different dicarboxylic acid anions form four coordination bonds with the alkali metal element. In formula (1), R is a naphthalene backbone structure, and A is an alkali metal element. Thus, the layered composition preferably has a structure in which the organic backbone layers are joined by the alkali metal element.

[Chem. 1]

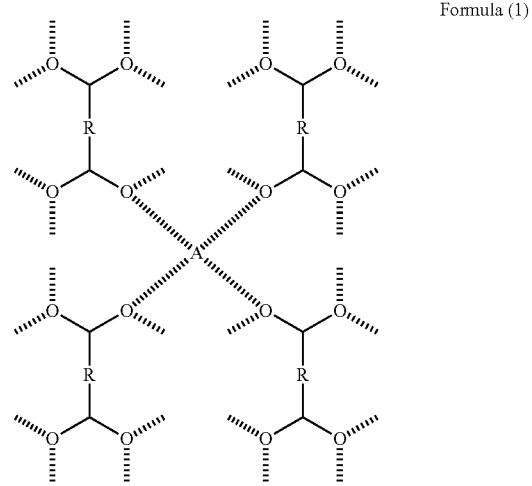

Formula (1)

(wherein R is a naphthalene backbone structure, and A is an alkali metal element.)

The organic backbone layers contain an aromatic compound that is a dicarboxylic acid anion having a naphthalene backbone structure. The aromatic compound contained in the organic backbone layers preferably has the two carboxylic acid anions of the dicarboxylic acid anion attached to diagonally opposite positions of the aromatic ring structures. This facilitates formation of the layered structure of the organic backbone layers and the alkali metal element layers. The diagonally opposite positions to which the carboxylic acids are attached may be, for example, the 2- and 6-positions of naphthalene. The aromatic compound contained in the organic backbone layers may have a structure represented by general formula (2).

[Chem. 2]

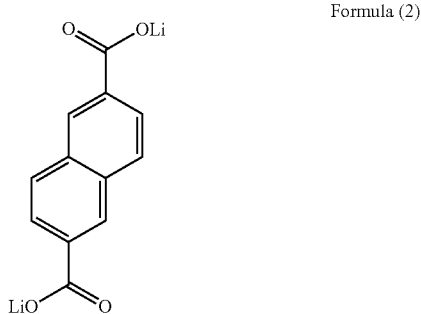

Formula (2)

As shown in FIG. 1, the alkali metal element contained in the alkali metal element layers is coordinated to the oxygen contained in the carboxylic acid anion to form a backbone. The alkali metal element may be one or more of Li, Na, and K, preferably Li. The alkali element contained in the alkali metal element layers is presumably not involved in ion migration during charge and discharge because it forms the backbone of the layered composition. As shown in FIG. 1, the layered composition thus constructed is formed by the organic backbone layers and the Li layers (alkali metal element layers) present between the organic backbone layers. In the energy storage mechanism of the layered composition, additionally, the organic backbone layers probably function as redox ($e^-$) sites, whereas the Li layers probably function as $Li^+$-absorbing sites. That is, the layered composition probably store and release energy as represented by formula (3). Furthermore, the organic backbone layers of the layered composition may have spaces into which Li can migrate, which presumably serve as sites capable of absorbing and releasing Li other than the alkali metal element layers in formula (3) to provide a higher charge-discharge capacity.

[Chem. 3]

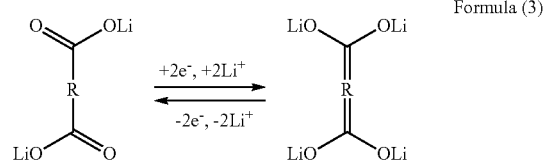

Formula (3)

Figure 2:
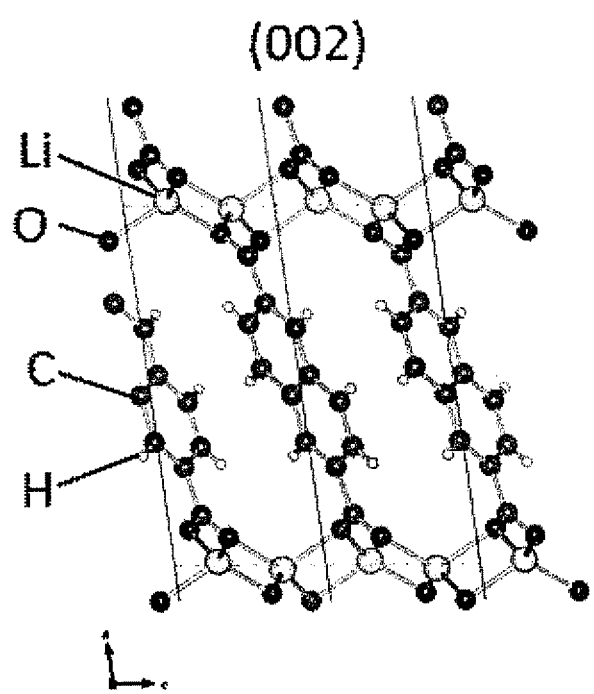
FIG. 2 is an illustration of (002) planes in the layered composition.
Figure 3:
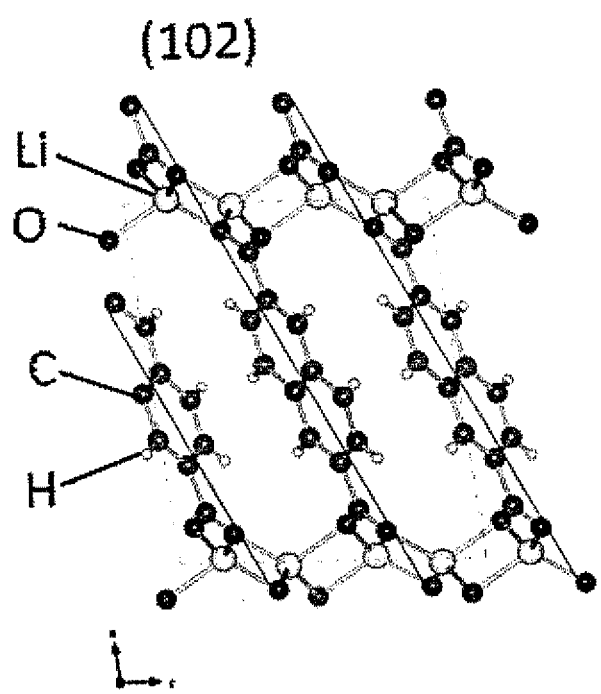
FIG. 3 is an illustration of (102) planes in the layered composition.
Figure 4:
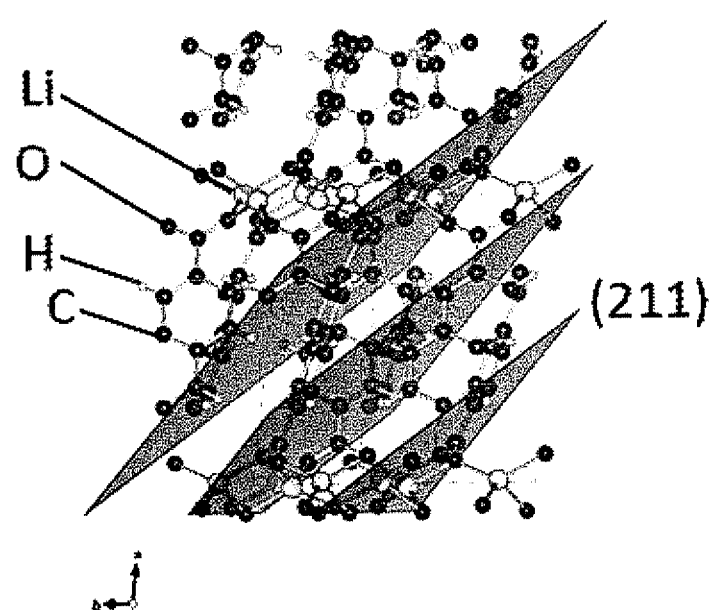
FIG. 4 is an illustration of (211) planes in the layered composition.
Figure 5:
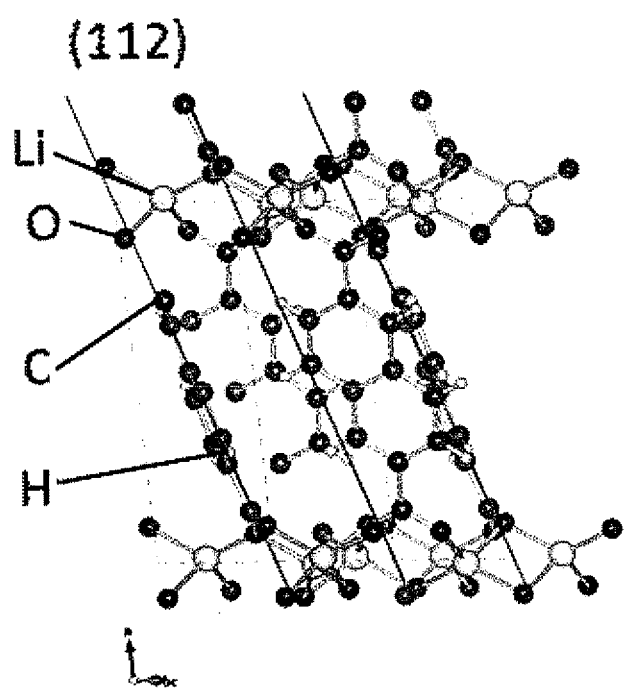
FIG. 5 is an illustration of (112) planes in the layered composition.

The layered composition forming the electrode active material of the present invention has an interplanar spacing between (002) planes of 0.42400 to 0.42800 nm as measured by X-ray diffraction. FIG. 2 is an illustration of (002) planes in the layered composition. FIGS. 2 to 6 show an example of a layered composition including organic backbone layers having a naphthalene backbone and alkali metal element layers containing lithium. In addition, the layered composition forming the electrode active material of the present invention has an interplanar spacing between (102) planes of 0.37000 to 0.37600 nm as measured by X-ray diffraction. FIG. 3 is an illustration of (102) planes in the layered composition. In addition, the layered composition forming the electrode active material of the present invention has an interplanar spacing between (211) planes of 0.32250 to 0.32650 nm as measured by X-ray diffraction. FIG. 4 is an illustration of (211) planes in the layered composition. In addition, the layered composition forming the electrode active material of the present invention has an interplanar spacing between (112) planes of 0.30400 to 0.30700 nm as measured by X-ray diffraction. FIG. 5 is an illustration of (112) planes in the layered composition. As shown in FIGS. 2 to 5, the interplanar spacings between (002) planes, (102) planes, (211) planes, and (112) planes in the layered composition are spacings based on the layered structure of the naphthalene backbones in the organic backbone layers. Because the layered composition has a structure whose interplanar spacings fall within the above ranges, it improves the capacity density and the cycling stability, thus improving the charge-discharge properties. The layered composition preferably has an interplanar spacing between (002) planes of 0.42549 to 0.42711 nm as measured by X-ray diffraction. In addition, the layered composition preferably has an interplanar spacing between (102) planes of 0.37263 to 0.37324 nm. In addition, the layered composition preferably has an interplanar spacing between (211) planes of 0.32408 to 0.32477 nm. In addition, the layered composition preferably has an interplanar spacing between (112) planes of 0.30538 to 0.30620 nm. Interplanar spacings within the preferred ranges further improve the capacity density and the cycling stability.

Figure 6:
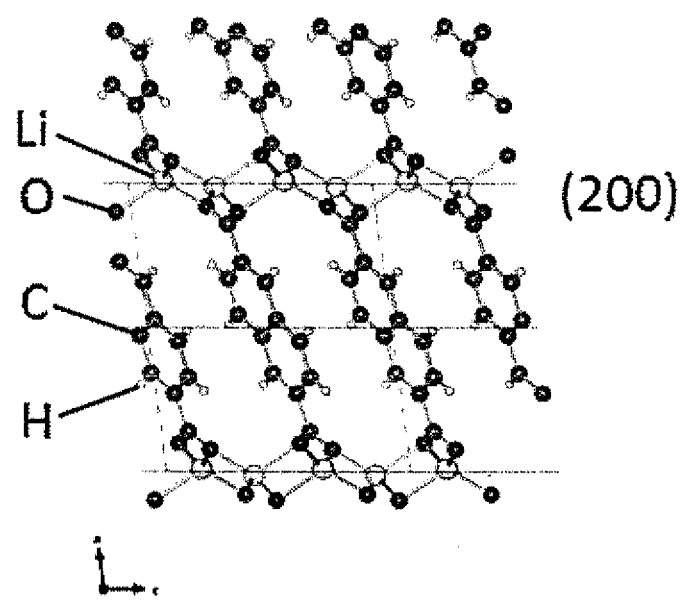
FIG. 6 is an illustration of (200) planes in the layered composition.

The layered composition preferably has an interplanar spacing between (200) planes of 0.50500 to 0.50950 nm as measured by X-ray diffraction. FIG. 6 is an illustration of (200) planes in the layered composition. As shown in FIG. 6, the interplanar spacing between (200) planes in the layered composition is a spacing based on the organic backbone layers between the alkali metal element layers. If the layered composition has a structure whose interplanar spacing falls within the above range, it improves the capacity density and the cycling stability, thus improving the charge-discharge properties. The layered composition preferably has an interplanar spacing between (200) planes of 0.50635 to 0.50866 nm as measured by X-ray diffraction.

Next, the nonaqueous secondary battery of the present invention will be described. The negative electrode of the nonaqueous secondary battery of the present invention may be formed by, for example, preparing a paste-like negative electrode mixture using a negative electrode active material made of a layered composition, a conductor, a binder, and a suitable solvent, applying the negative electrode mixture to a surface of a collector and drying it, and optionally compressing the coating for higher electrode density. The conductor may be any electron-conducting material that does not adversely affect the battery performance of the negative electrode, for example, one or a mixture of two or more of graphites such as natural graphite (flaky graphite and scaly graphite) and artificial graphite, acetylene black, carbon black, Ketjen black, carbon whisker, needle coke, carbon fiber, metals (e.g., copper, nickel, aluminum, silver, and gold), and the like. Among these conductors, carbon black and acetylene black are preferred for higher electron conductivity and coatability. Examples of binders, which function to bind active material particles with conductor particles, include fluorine-containing resins such as polytetrafluoroethylene (PTFE), polyvinylidene fluoride (PVDF), and fluororubbers, thermoplastic resins such as polypropylene and polyethylene, ethylene-propylene-diene monomer (EPDM) rubber, sulfonated EPDM rubber, and natural butyl rubber (NBR), which can be used alone or as a mixture of two or more. Other examples include water-based binders such as cellulose binders and aqueous styrene-butadiene rubber (SBR) dispersions. Examples of solvents for dispersing the negative electrode active material, the conductor, and the binder include organic solvents such as N-methylpyrrolidone, dimethylformamide, dimethylacetoamide, methyl ethyl ketone, cyclohexanone, methyl acetate, methyl acrylate, diethylenetriamine, N,N-dimethylaminopropylamine, ethylene oxide, and tetrahydrofuran. The active material can also be slurried with, for example, a latex of SBR in water containing a dispersant and a thickener. Examples of thickeners include polysaccharides such as carboxymethyl cellulose and methyl cellulose, which can be used alone or as a mixture of two or more. Examples of coating techniques include roller coating using applicator rollers, screen coating, doctor blade coating, spin coating, and bar coating, any of which can be used to provide any thickness and shape. Examples of collectors include copper, nickel, stainless steel, titanium, aluminum, baked carbon, conductive polymer, conductive glass, and Al—Cd alloy collectors, as well as collectors formed of copper or the like and surface-treated with carbon, nickel, titanium, silver, or the like for improved adhesion, conductivity, and reduction resistance. The collector of the negative electrode is preferably formed of aluminum metal. That is, the layered composition is preferably provided on an aluminum metal collector. This is because aluminum is abundant and is highly resistant to corrosion. Such collectors can also be surface-treated by oxidation. Examples of shapes of collectors include foils, films, sheets, nets, punched or expanded shapes, laths, porous shapes, foams, and fiber bundles. The collector has a thickness of, for example, 1 to 500 μm.

The electrode of the nonaqueous secondary battery of the present invention may be formed by providing an electrode mixture containing a layered composition and a conductor on a collector and baking the electrode mixture in a temperature range of 250° C. to 450° C. in an inert atmosphere. The layered composition includes organic backbone layers containing an aromatic compound that is a dicarboxylic acid anion having a naphthalene backbone and alkali metal element layers containing an alkali metal element coordinated to oxygen contained in the carboxylic acid anion to form a backbone. In this manner, the interplanar spacings between (002) planes, (102) planes, (211) planes, (112) planes, and (200) planes in the layered composition can be relatively easily controlled within the above ranges. In baking, a baking temperature of 250° C. or higher is preferred for improved charge-discharge properties, and a baking temperature of 450° C. or lower is preferred for reduced structural damage to the layered composition. Preferably, the baking temperature is 275° C. to 350° C., more preferably about 300° C. The baking time is selected depending on the baking temperature and is preferably, for example, 2 to 24 hours. In addition, the inert atmosphere may be, for example, an inert gas such as nitrogen gas, He, or Ar, preferably Ar. The conductor and the collector may be those described above, and as described above, the electrode mixture may contain a binder and a solvent.

The positive electrode of the nonaqueous secondary battery of the present invention may be formed by, for example, preparing a paste-like positive electrode mixture using a positive electrode active material, a conductor, a binder, and a suitable solvent, applying the positive electrode mixture to a surface of a collector and drying it, and optionally compressing the coating for higher electrode density. Examples of positive electrode active materials include sulfides containing a transition metal element and oxides containing lithium and a transition metal element. Specific examples include transition metal sulfides such as $TiS_2$, $TiS_3$, $MoS_3$, and $FeS_2$; lithium manganese multiple oxides such as $Li_{(1-a)}MnO_2$ (e.g., $0<a<1$, which applies hereinafter) and $Li_{(1-a)}Mn_2O_4$; lithium cobalt multiple oxides such as $Li_{(1-a)}CoO_2$; lithium nickel multiple oxides such as $Li_{(1-a)}NiO_2$; lithium vanadium multiple oxides such as $LiV_2O_3$; and transition metal oxides such as $V_2O_5$. Particularly preferred are transition metal multiple oxides of lithium, including $LiCoO_2$, $LiNiO_2$, $LiMnO_2$, and $LiV_2O_3$. Examples of conductors, binders, and solvents used for the positive electrode include those illustrated for the negative electrode. Examples of collectors for the positive electrode include aluminum, titanium, stainless steel, nickel, iron, baked carbon, conductive polymer, and conductive glass collectors, as well as collectors formed of aluminum, copper, or the like and surface-treated with carbon, nickel, titanium, silver, or the like for improved adhesion, conductivity, and oxidation resistance. Such collectors can also be surface-treated by oxidation. The shape of the collector may be similar to that of the collector for the negative electrode.

The ion-conducting medium of the nonaqueous secondary battery of the present invention may be, for example, a nonaqueous electrolyte solution or nonaqueous gel electrolyte solution containing a support salt. Examples of solvents for nonaqueous electrolyte solutions include carbonates, esters, ethers, nitriles, furans, sulfolanes, and dioxolanes, which can be used alone or as a mixture. Specific examples include, as carbonates, cyclic carbonates such as ethylene carbonate, propylene carbonate, vinylene carbonate, butylene carbonate, and chloroethylene carbonate and linear carbonates such as dimethyl carbonate, ethyl methyl carbonate, diethyl carbonate, ethyl-n-butyl carbonate, methyl-t-butyl carbonate, di-i-propyl carbonate, and t-butyl-i-propyl carbonate; cyclic esters such as γ-butyrolactone and γ-valerolactone; linear esters such as methyl formate, methyl acetate, ethyl acetate, and methyl lactate; ethers such as dimethoxyethane, ethoxymethoxyethane, and diethoxyethane; nitriles such as acetonitrile and benzonitrile; furans such as tetrahydrofuran and methyltetrahydrofuran; sulfolanes such as sulfolane and tetramethylsulfolane; and dioxolanes such as 1,3-dioxolane and methyldioxolane. Particularly preferred are combinations of a cyclic carbonate and a linear carbonate. Such combinations are advantageous not only in terms of cyclability, which indicates battery properties after repeated charge and discharge, but also in terms of the balance of the properties such as the viscosity of the electrolyte solution, the electrical capacity of the resulting battery, and the output of the battery. The cyclic carbonate probably increases the dielectric constant of the electrolyte solution because of its relatively high dielectric constant, whereas the linear carbonate probably reduces the viscosity of the electrolyte solution.

Examples of support salts contained in the nonaqueous secondary battery of the present invention include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$. In particular, one or a combination of two or more salts selected from the group consisting of inorganic salts such as $LiPF_6$, $LiBF_4$, $LiAsF_6$, and $LiClO_4$ and organic salts such as $LiCF_3SO_3$, $LiN(CF_3SO_2)_2$, and $LiC(CF_3SO_2)_3$ is preferably used for improved electrical properties. The concentration of the support salt in the nonaqueous electrolyte solution is preferably 0.1 to 5 mol/L, more preferably 0.5 to 2 mol/L. A support salt concentration of 0.1 mol/L or more provides sufficient current density, whereas a support salt concentration of 5 mol/L or less improves the stability of the electrolyte solution. The nonaqueous electrolyte solution may contain a flame retardant such as a phosphorus- or halogen-containing flame retardant.

Instead of a liquid ion-conducting medium, the ion-conducting medium may be a solid ion-conducting polymer. The ion-conducting polymer may be a polymer gel containing a polymer, such as acrylonitrile, ethylene oxide, propylene oxide, methyl methacrylate, vinyl acetate, vinylpyrrolidone, or polyvinylidene fluoride, and a support salt. The ion-conducting polymer may also be used in combination with a nonaqueous electrolyte solution. In addition to ion-conducting polymers, examples of available ion-conducting media include inorganic solid electrolytes, mixtures of organic polymer electrolytes and inorganic solid electrolytes, and inorganic solid powders bound by organic binders.

The nonaqueous secondary battery of the present invention may include a separator between the positive electrode and the negative electrode. The separator may be formed of any composition that can be used in the operating range of the nonaqueous secondary battery, including polymer nonwoven fabrics such as polypropylene and polyphenylene sulfide nonwoven fabrics and thin macroporous films of olefin resins such as polyethylene and polypropylene. They may be used alone or as a mixture thereof.

Figure 7:
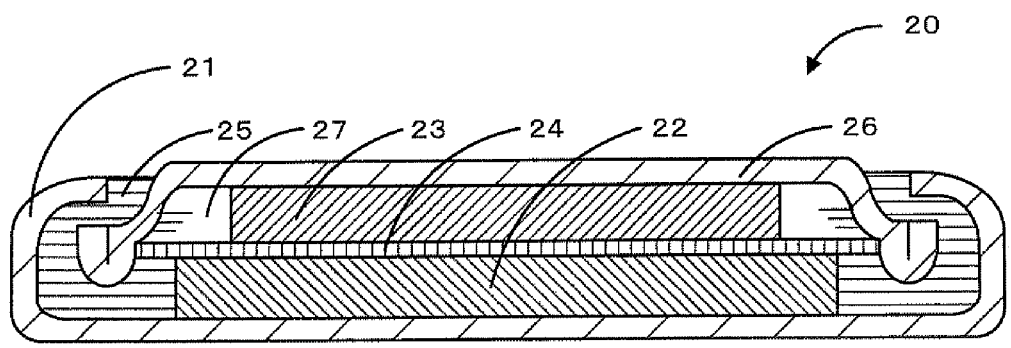
FIG. 7 is a schematic view showing an example of a nonaqueous secondary battery 20 of the present invention.

Examples of shapes of the nonaqueous secondary battery of the present invention include, but not limited to, coins, buttons, sheets, laminates, cylinders, flat shapes, and rectangles. The nonaqueous secondary battery is also applicable to large batteries for use with, for example, electric cars. FIG. 7 is a schematic view showing an example of a nonaqueous secondary battery 20 of the present invention. This nonaqueous secondary battery 20 includes a cup-shaped battery case 21, a positive electrode 22 containing a positive electrode active material and disposed on the bottom of the battery case 21, a negative electrode 23 containing a negative electrode active material and disposed opposite the positive electrode 22 with a separator 24 therebetween, a gasket 25 formed of an insulator, and a sealing plate 26 disposed at the opening of the battery case 21 to seal the battery case 21 with the gasket 25 therebetween. A space between the positive electrode 22 and the negative electrode 23 in the nonaqueous secondary battery 20 is filled with an ion-conducting medium 27 containing an alkali metal salt (lithium salt). The negative electrode 23 contains, as a negative electrode active material, a layered composition including organic backbone layers containing an aromatic compound that is a dicarboxylic acid anion having a naphthalene backbone structure and having the two carboxylic acid anions of the dicarboxylic acid anion bonded to diagonally opposite positions of the aromatic compound and alkali metal element layers having an alkali metal element coordinated to oxygen contained in the carboxylic acid anion.

In the nonaqueous secondary battery of the present invention described in detail above, the layered composition, serving as an active material, has four coordination bonds between Li and the oxygen in the dicarboxylic acid, which presumably makes it insoluble in the nonaqueous electrolyte solution to maintain its crystal structure, thus improving the stability of the charge-discharge cyclability. In the layered composition, the organic backbone layers presumably function as redox sites, whereas the Li layers presumably function as Li-ion absorbing sites. In addition, the negative electrode has a charge-discharge potential of 0.5 to 1.0 V with respect to lithium metal, which prevents a significant decrease in energy density due to a decrease in the operating voltage of the battery and also prevents precipitation of lithium metal. This novel layered composition (crystalline organic-inorganic composite material) presumably improves the charge-discharge properties. Furthermore, because the layered composition has a structure whose interplanar spacings, measured by X-ray diffraction, between planes such as (002) planes, (102) planes, (211) planes, and (112) planes fall within the preferred ranges, it increases the n-electron interaction of the aromatic compound, thus allowing exchange of more electrons. In addition, particularly if the layered composition has a structure whose interplanar spacing between (200) planes falls within the preferred range, the layered composition has fewer defects in the alkali metal element layers, which are made of an alkali metal and oxygen, and thus allows exchange of more ions, which increases the performance as an electrode active material. This presumably improves the capacity density and the cycling stability and thus improves the charge-discharge properties.

It should be understood that the present invention is not limited to the above embodiment but can be practiced in various embodiments within the technical scope of the present invention.

For example, although the interplanar spacings, measured by X-ray diffraction, between planes such as (002) planes, (102) planes, (211) planes, (112) planes, and (200) planes in the layered composition are controlled within the preferred ranges for improved charge-discharge properties by baking the nonaqueous secondary battery electrode containing the layered composition in the embodiment described above, the interplanar spacings may be controlled within the preferred ranges in other manners. For example, the interplanar spacings between (002) planes, (102) planes, (211) planes, (112) planes, and (200) planes may be controlled within the preferred ranges by setting conditions preferred for preparation of the layered composition. Alternatively, the layered composition may be formed by allowing an alkali metal element to coordinate to naphthalenedicarboxylic acid, be baked as a mixture with a carbon material (e.g., a conductor) to achieve the preferred interplanar spacings, and be applied as a paste-like electrode mixture to a collector.

Although the above embodiment illustrates a nonaqueous secondary battery, a nonaqueous secondary battery electrode and an electrode active material may also be provided.

EXAMPLES

Specific examples of fabrication of nonaqueous secondary batteries of the present invention will be described below as the Examples. First, results of research on layered compositions will be described below as the Experimental Examples.

Experimental Example 1

Lithium 2,6-naphthalenedicarboxylate was synthesized as a layered composition shown in FIG. 1. The lithium 2,6-naphthalenedicarboxylate was a layered composition including organic backbone layers having the basic structure represented by formula (4) below. The starting materials used for synthesis of the lithium 2,6-naphthalenedicarboxylate were 2,6-naphthalenedicarboxylic acid and lithium hydroxide monohydrate ($LiOH \cdot H_2O$). First, 100 mL of methanol was added to 0.556 g of lithium hydroxide monohydrate, and it was stirred. After the lithium hydroxide monohydrate was dissolved, 1.0 g of 2,6-naphthalenedicarboxylic acid was added, and it was stirred for one hour. After stirring, the solvent was removed, and the residue was dried in vacuo at 150° C. for 16 hours to yield a white powder sample. The resulting white powder sample is referred to as an active material powder of Experimental Example 1.

[Chem. 4]

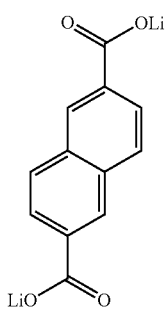

Formula (4)

Fabrication of Coated Electrode

A nonaqueous secondary battery electrode was fabricated using the active material powder of Experimental Example 1. A slurried mixture was prepared by mixing 60% by mass of the lithium 2,6-naphthaleledicarboxylate of Experimental Example 1, 30% by mass of carbon black as a conductor, and 10% by mass of polyvinylidene fluoride as a binder and dispersing the mixture using an appropriate amount of N-methyl-2-pyrrolidone as a dispersant. The slurried mixture was uniformly applied to a 10 μm thick copper foil collector and was dried by heating to fabricate a coated sheet. The coated sheet was then pressed and punched to prepare a circular electrode having an area of 2.05 cm².

Fabrication of Bipolar Test Cell

A nonaqueous electrolyte solution was prepared by adding lithium hexafluorophosphate to a concentration of 1 mol/L in a nonaqueous solvent containing ethylene carbonate, dimethyl carbonate, and ethyl methyl carbonate in a volume ratio of 30:40:30. A bipolar test cell was fabricated by holding a separator (Tonen Tapyrus Co., Ltd.) impregnated with the above nonaqueous electrolyte solution between the above electrode, serving as a working electrode, and a lithium metal foil (300 μm thick), serving as a counter electrode. The resulting cell is referred to as a bipolar test cell of Experimental Example 1.

Experimental Example 2

A white powder sample was yielded as an active material powder of Experimental Example 2 by repeating the procedure of Experimental Example 1 except that lithium terephthalate was synthesized instead of the lithium 2,6-naphthalenedicarboxylate of Experimental. Example 1. This active material was a layered composition including organic backbone layers having the basic structure represented by formula (5) below. Also, a nonaqueous secondary battery electrode of Experimental Example 2 was fabricated by repeating the procedure of Experimental Example 1 using the active material powder of Experimental Example 2, and a bipolar test cell was fabricated using the nonaqueous secondary battery electrode of Experimental Example 2.

[Chem. 5]

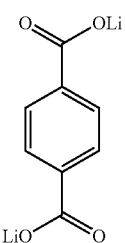

Formula (5)

Experimental Example 3

A white powder sample was yielded as an active material powder of Experimental Example 3 by repeating the procedure of Experimental Example 1 except that lithium 2,3-naphthalenedicarboxylate was synthesized instead of the lithium 2,6-naphthalenedicarboxylate of Experimental Example 1. This active material, described in detail later, did not form a layered composition and was a compound having formula (6) below. Also, a nonaqueous secondary battery electrode of Experimental Example 3 was fabricated by repeating the procedure of Experimental Example 1 using the active material powder of Experimental Example 3, and a bipolar test cell was fabricated using the nonaqueous secondary battery electrode of Experimental Example 3.

[Chem. 6]

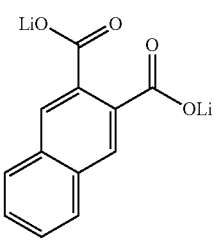

Formula (6)

(X-Ray Diffraction Measurement)

Figure 8:
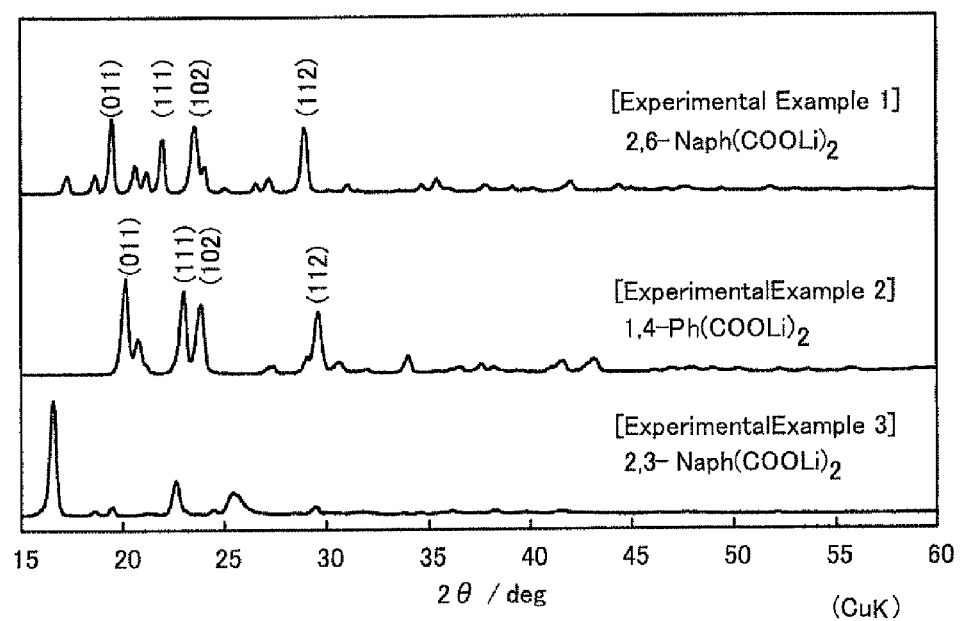
FIG. 8 shows results of X-ray diffraction measurements for Experimental Examples 1 to 3.

Powdered X-ray diffraction measurement was performed on the active material powders of Experimental Examples 1 to 3. In the measurement, the Cu—Kα line (wavelength: 1.54051 Å) was used as radiation, and an X-ray diffractometer (Rigaku RINT-2200) was used. In the measurement, additionally, a single-crystal graphite monochromator was used as a monochromatic X-ray source, the applied voltage was set to 40 kV, the current was set to 30 mA, the scan rate was set to 4°/min, and the angular range was set to 2θ=10° to 90°. FIG. 8 shows the results of the X-ray diffraction measurement for the active material powders of Experimental Examples 1 to 3. As shown in FIG. 8, the active material powders of Experimental Examples 1 and 2 presumably had a layered structure of lithium layers and organic backbone layers as shown in FIG. 1 because they showed clear (001), (111), (102), and (112) peaks based on the assumption that they were monoclinic crystals belonging to the space group $P2_1/c$. In addition, because the active material powders of Experimental Examples 1 and 2 were monoclinic crystals belonging to the space group $P2_1/c$, they presumably had a structure in which the oxygen in four different aromatic dicarboxylic acid molecules formed four coordination bonds with lithium and had interaction between π-electron conjugated clouds in the organic backbone thereof. In contrast, the active material powder of Experimental Example 3, which is structurally unlikely to form alkali metal layers in view of the bond positions of the dicarboxylic acid anion, showed no peak attributed to the space group $P2_1/c$, demonstrating that it had a different crystal structure.

(Simultaneous Thermogravimetry and Differential Calorimetry)

Figure 9:
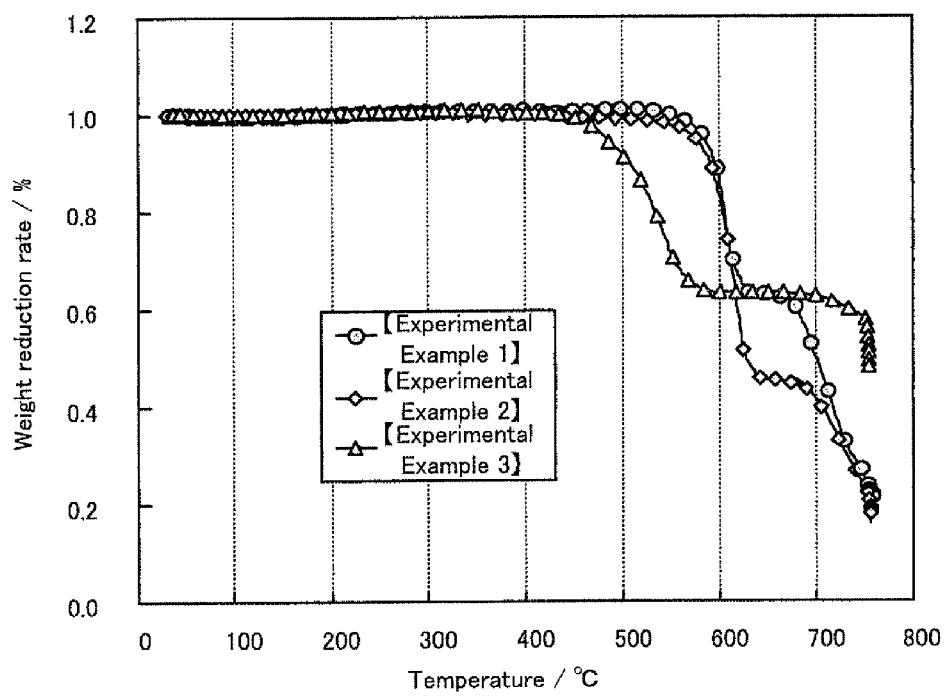
FIG. 9 shows results of simultaneous thermogravimetry and differential calorimetry for Experimental Examples 1 to 3.

Simultaneous thermogravimetry and differential calorimetry was performed on the active material powders of Experimental Examples 1 to 3. In the measurement, a simultaneous thermogravimeter-differential calorimeter (Rigaku Thermo Mass) was used. In the measurement, the measurement temperature range was set to room temperature to 750° C., and the heating rate was set to 10° C./min. FIG. 9 shows the results of the simultaneous thermogravimetry and differential calorimetry for Experimental Examples 1 to 3. As shown in FIG. 9, whereas the mass in Experimental Example 3 started decreasing around 450° C., the masses in Experimental Examples 1 and 2 started decreasing at higher temperatures, i.e., around 550° C., demonstrating that they had improved thermal stability. This is presumably because the monoclinic crystal structures belonging to the space group $P2_1/c$ in Experimental Examples 1 and 2 were organized by π-electron interaction and had four coordination bonds between oxygen from four different aromatic dicarboxylic acids and lithium, thus forming a crystal with superior thermal stability.

(Charge-Discharge Test)

Figure 10:
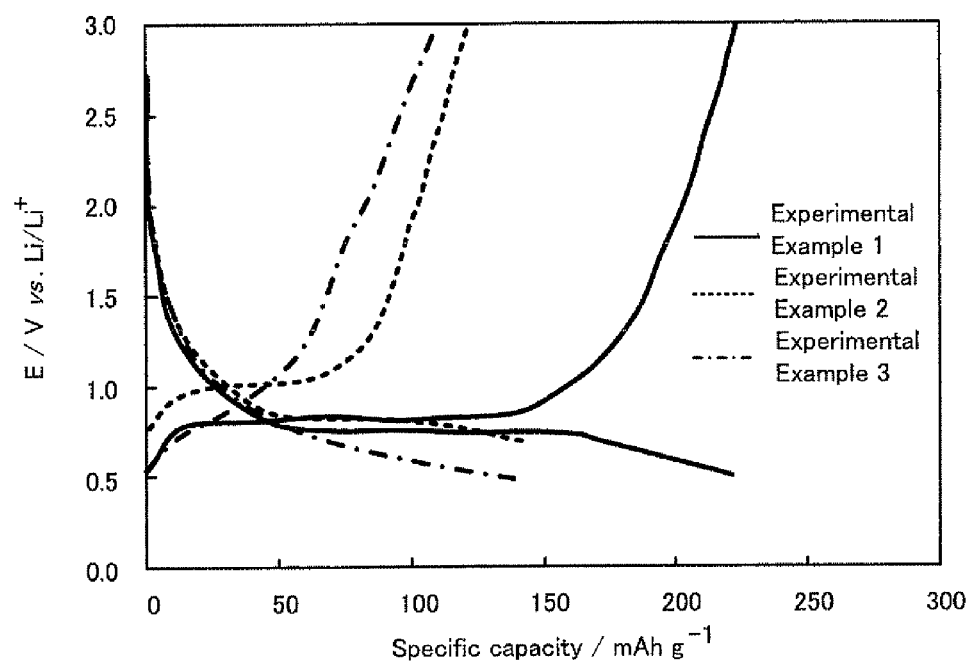
FIG. 10 shows charge-discharge curves for Experimental Examples 1 to 3.

In an environment with a temperature of 20° C., the bipolar test cells of Experimental Examples 1 to 3 were reduced (charged) to 0.5 V at 0.02 mA and were then oxidized (discharged) to 3.0 V at 0.02 mA. FIG. 10 shows charge-discharge curves for Experimental Examples 1 to 3. As shown in FIG. 10, the cell of Experimental Example 1 exhibited a higher oxidation capacity than those of Experimental Examples 2 and 3. For example, the cell of Experimental Example 1 exhibited an oxidation capacity higher than the theoretical capacity, i.e., 200 mAh/g. This is presumably because lithium was also absorbed into and released from the space formed in the organic backbone layers. In addition, whereas the cell of Experimental Example 1 exhibited a flat potential region, i.e., a plateau region, the cell of Experimental Example 3 exhibited no clear plateau region. The cell of Experimental Example 1 provided a flat potential region presumably because it had a layered structure of lithium layers and organic backbone layers. The cell of Experimental Example 2 had a lower charge-discharge capacity than that of Experimental Example 1. This is presumably due to, for example, low conductivity because of the presence of only one aromatic ring. If there is only one aromatic ring, the π-electron interaction in the aromatic ring probably decreases with slight volume changes during absorption of lithium, which reduces the overlap of π-electrons and therefore decreases the conductivity, thus decreasing the charge-discharge capacity. In contrast, for Experimental Example 1, where there were two or more aromatic rings, the charge-discharge capacity did not decrease presumably because their large overlap of π-electrons provided stable conductivity irrespective of volume changes during absorption of lithium. In addition, the cell of Experimental Example 1 allows a high-voltage battery design because the plateau region of Experimental Example 1 is lower than that of Experimental Example 2. The potential of the plateau region with respect to lithium metal in Experimental Example 1 was in the range of 0.7 to 0.85 V, which is higher than, for example, the potential of graphite as a negative electrode active material with respect to lithium metal, thus causing little lithium metal to precipitate on the negative electrode. In addition, the potential with respect to lithium metal in Experimental Example 1 is lower than the potential of a multiple oxide (e.g., lithium titanium oxide) as a negative electrode active material, i.e., 1.5 V, with respect to lithium metal, thus providing a higher battery voltage. In addition, the negative electrode active material of Experimental Example 1 is presumably structurally and thermally more stable than metal silicon as a negative electrode active material, thus providing a higher charge-discharge cyclability. These results demonstrate that a layered composition (crystalline organic-inorganic composite material) can be used as an electrode active material with superior charge-discharge cyclability even if the interplanar spacings, measured by X-ray diffraction, between planes such as (002) planes, (102) planes, (211) planes, and (112) planes do not fall within the preferred ranges.

Next, results of research on layered compositions whose interplanar spacings, measured by X-ray diffraction, between (002) planes, (102) planes, (211) planes, (112) planes, and (200) planes fall within the preferred ranges will be described as the Examples.

Example 1

Lithium 2,6-naphthalenedicarboxylate was synthesized by repeating the procedure of Experimental Example 1. The starting materials used were 2,6-naphthalenedicarboxylic acid and lithium hydroxide monohydrate (LiOH.H$_2$O). Methanol (100 mL) was added to lithium hydroxide monohydrate (0.556 g), and it was stirred. After the lithium hydroxide monohydrate was dissolved, 2,6-naphthalenedicarboxylic acid (1.0 g) was added, and it was stirred for one hour. After stirring, the solvent was removed, and the residue was dried in vacuo at 150° C. for 16 hours to yield a white powder sample.

[Fabrication of Coated Electrode]

A slurried electrode mixture was prepared by mixing 66.7% by mass of the electrode active material (lithium 2,6-naphthalenedicarboxylate) of Example 1 prepared as above, 11.1% by mass of carbon black as a conductor, 11.1% by mass of fibrous carbon (vapor-grown carbon fiber (VGCF)) as a conductor, and 10% by mass of polyvinylidene fluoride as a binder and dispersing the mixture using an appropriate amount of N-methyl-2-pyrrolidone as a dispersant. The slurried electrode mixture was uniformly applied to a 10 μm thick copper foil collector and was dried by heating to fabricate a coated sheet. The coated sheet was then pressed and punched to prepare a circular electrode having an area of 2.05 cm$^2$. The circular electrode was then baked at 300° C. in an argon inert atmosphere for 12 hours.

[Fabrication of Bipolar Test Cell]

A nonaqueous electrolyte solution was prepared by adding lithium hexafluorophosphate to a concentration of 1 mol/L in a nonaqueous solvent containing ethylene carbonate, dimethyl carbonate, and ethyl methyl carbonate in a volume ratio of 30:40:30. A bipolar test cell was fabricated by holding a separator (Tonen Tapyrus Co., Ltd.) impregnated with the above nonaqueous electrolyte solution between the above electrode, serving as a working electrode, and a lithium metal foil (300 μm thick), serving as a counter electrode. The resulting cell is referred to as a bipolar test cell of Example 1.

(Charge-Discharge Test)

In an environment with a temperature of 20° C., the above bipolar test cell was reduced (charged) to 0.5 V at 0.03 mA and was then oxidized (discharged) to 2.0 V at 0.03 mA. The capacity retention (%) after ten cycles was determined as Q(10th)/Q(1st)×100, where Q(1st) is the discharge capacity for the first charge-discharge operation, and Q(10th) is the discharge capacity for the tenth charge-discharge operation.

(X-Ray Diffraction Measurement)

An X-ray diffraction measurement was performed on the nonaqueous secondary battery electrode (dilithium 2,6-naphthalenedicarboxylate electrode) of Example 1. In the measurement, an X-ray diffractometer (Rigaku RINT-2200) that used the Cu—Kα line (wavelength: 1.54051 Å) as radiation was used. In the measurement, a single-crystal graphite monochromator was used as a monochromatic X-ray source, the applied voltage was set to 40 kV, and the current was set to 30 mA. In the measurement, recording was performed at a scan rate of 4°/min over an angular range of 2θ=15° to 30°.

Examples 2 and 3

To examine reproducibility, lithium 2,6-naphthalenedicarboxylate was synthesized in different batches (on different dates). Electrodes were fabricated by repeating the procedure of Example 1. The resulting electrodes are referred to as Examples 2 and 3.

Example 4

An electrode that was the same as the electrode of Example 1 and that underwent one charge-discharge cycle described above is referred to as Example 4. An X-ray diffraction measurement was performed on the electrode of Example 4.

Example 5

An electrode that was the same as the electrode of Example 1 and that underwent ten charge-discharge cycles described above is referred to as Example 5. An X-ray diffraction measurement was performed on the electrode of Example 5.

Comparative Example 1

An electrode was fabricated as Comparative Example 1 by repeating the procedure of Example 1 except that the electrode was not baked after fabrication.

(Results and Discussions)

Figure 11:
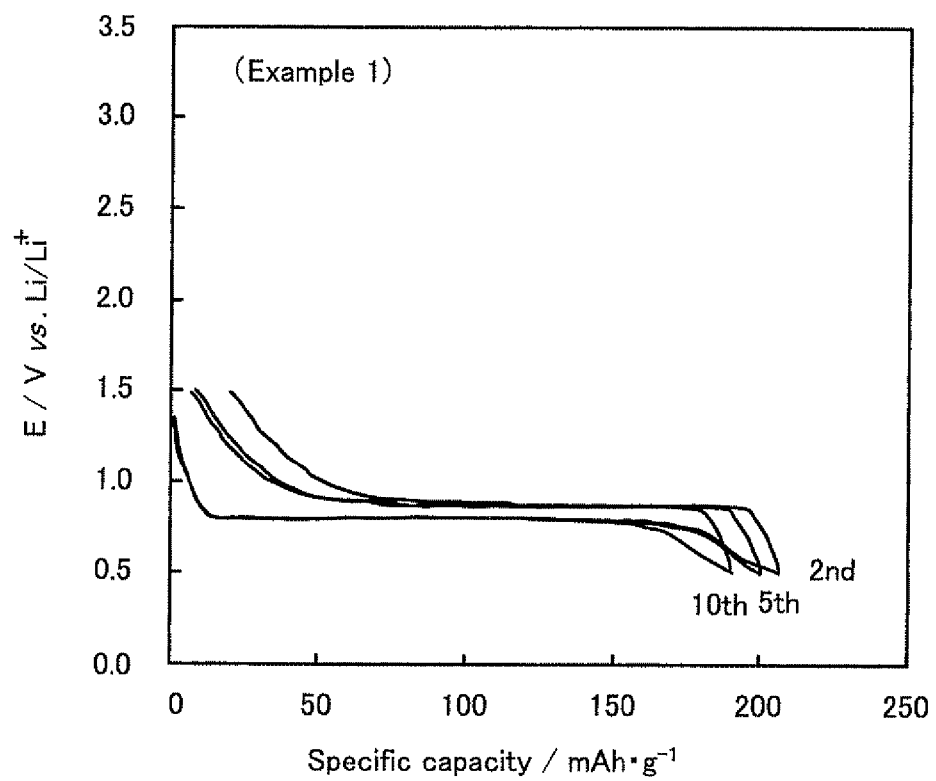
FIG. 11 shows charge-discharge curves for Example 1.
Figure 12:
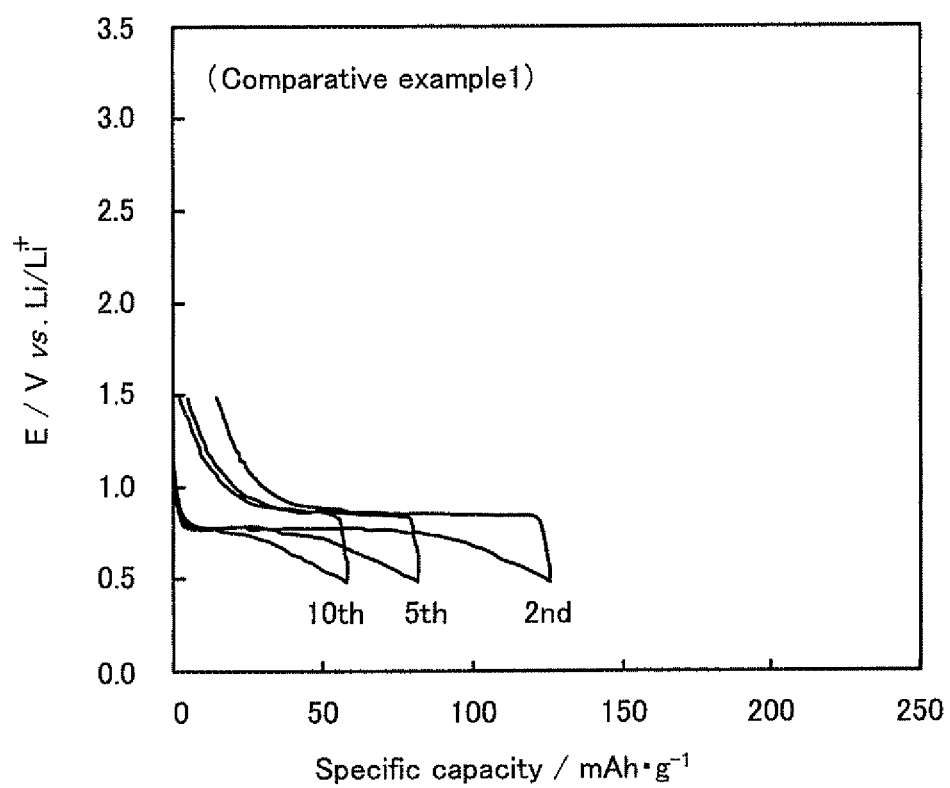
FIG. 12 shows charge-discharge curves for Comparative Example 1.
Figure 13:
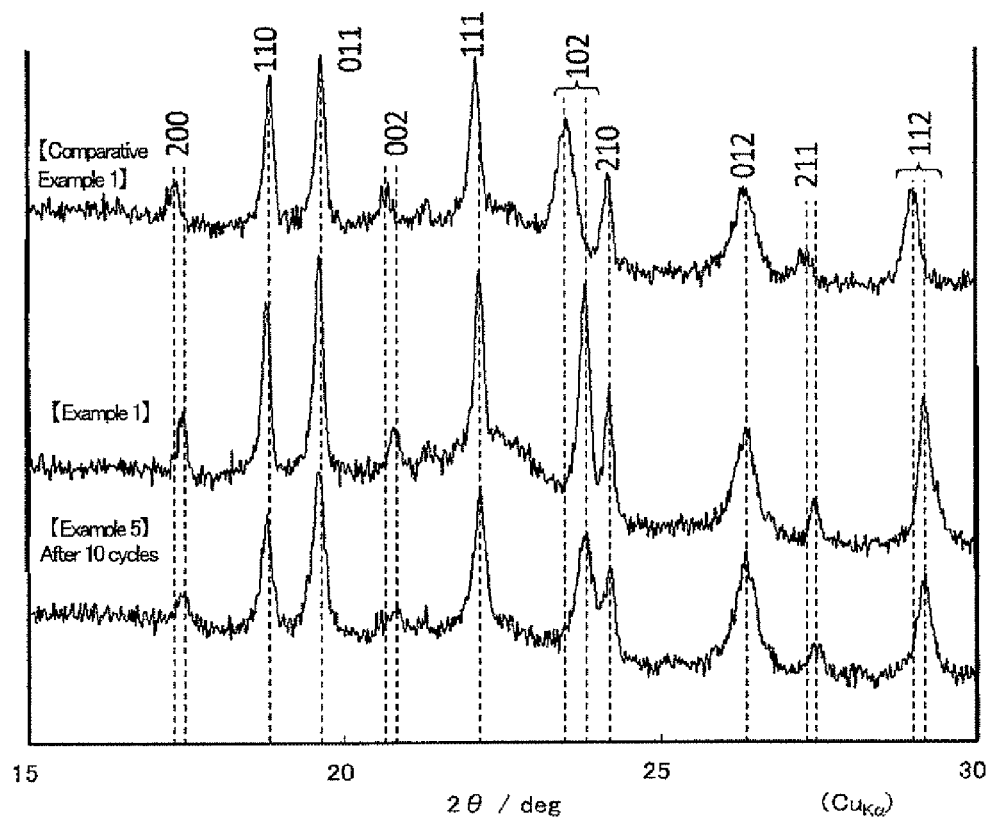
FIG. 13 shows results of X-ray diffraction measurements for Examples 1 and 5 and Comparative Example 1.

FIG. 11 shows charge-discharge curves for Example 1, and FIG. 12 shows charge-discharge curves for Comparative Example 1. In addition, Table 1 summarizes the oxidation capacities after the first and tenth cycles and the capacity retentions of Examples 1 to 3 and Comparative Example 1. Examples 1 to 5 exhibited higher initial capacities and capacity retentions after the tenth cycle than Comparative Example 1. FIG. 13 shows the results of the X-ray diffraction measurement for Examples 1 and 5 and Comparative Example 1. In addition, Table 2 summarizes the interplanar spacings of Examples 1 to 5 and Comparative Example 1. Example 1 had narrower interplanar spacings corresponding to (002) planes, (102) planes, (211) planes, (112) planes, and (200) planes than Comparative Example 1. In addition, the electrode of Example 1 exhibited no substantial change in diffraction peak after the charge-discharge cycle, demonstrating that it charged and discharged while maintaining a stable crystal structure. Because Examples 1 to 5 had narrower interplanar spacings between (002) planes (FIG. 2), (102) planes (FIG. 3), (112) planes (FIG. 4), and (211) planes (FIG. 5), which correspond to the stacking of the naphthalene backbones, in the layered composition than Comparative Example 1, more π-electrons were probably exchanged between naphthalene backbones, thus improving the initial capacity retention. In addition, the interplanar spacing between (200) planes (FIG. 6) in the layered composition corresponds to the stacking of the organic layers having a naphthalene backbone and the inorganic layers of $LiO_4$. Because Examples 1 to 5 had narrower interplanar spacings than Comparative Example 1, the bonds between the layers were probably more robust and stable and thus provided lithium diffusion paths. This probably increased the reversibility of lithium insertion/deinsertion during charge and discharge, thus improving the capacity retention after charge-discharge cycles. These results demonstrate that an electrode active material having an interplanar spacing between (002) planes of 0.42400 to 0.42800 nm, an interplanar spacing between (102) planes of 0.37000 to 0.37600 nm, an interplanar spacing between (211) planes of 0.32250 to 0.32650 nm, an interplanar spacing between (112) planes of 0.30400 to 0.30700 nm, and an interplanar spacing between (200) planes of 0.50500 to 0.50950 nm, as measured by X-ray diffraction, allows exchange of more electrons and lithium ions during charge and discharge, thus providing improved initial capacity and superior charge-discharge cyclability.

An electrode baked at 200° C. did not achieve the above interplanar spacings. In addition, the results of the simultaneous thermogravimetry and differential calorimetry in FIG. 9 suggest that a baking temperature of not higher than 450° C. is desirable in view of the decomposition temperature. Presumably, therefore, the electrode is preferably baked at 250° C. to 450° C. A baked electrode formed only of a layered composition was also examined, and the baked electrodes containing a layered composition and other components such as a conductor yielded more preferable results than the baked electrode formed only of a layered composition. Presumably, therefore, the presence of the components such as a conductor and a binder may also contribute to achieving the preferred interplanar spacings described above after baking. Furthermore, any method other than baking the electrode presumably may be used as long as a layered composition whose interplanar spacings fall within the above preferred ranges can be prepared.

TABLE 1

|  | Oxidation capacity $Q(1st)_{oxi}$[1] mAh/g | Oxidation capacity $Q(10th)_{oxi}$[2] mAh/g | Capacity retention[3] (%) |
|---|---|---|---|
| Example 1 | 192 | 184 | 95.8 |
| Example 2 | 212 | 202 | 95.3 |
| Example 3 | 227 | 217 | 95.6 |
| Comparative Example 1 | 135 | 56 | 41.5 |

[1]$Q(1st)_{oxi}$: Oxidation capacity for the first charge-discharge operation
[2]$Q(10th)_{oxi}$: Oxidation capacity for the tenth charge-discharge operation
[3]Capacity retention (%) = (Q10th)/(Q1st) × 100

TABLE 2

|  | Baking electrode | Interplanar spacing (nm) | | | | |
|---|---|---|---|---|---|---|
|  |  | [200] planes | [002] planes | [102] planes | [211] planes | [112] planes |
| Example 1 | Baked | 0.50866 | 0.42711 | 0.37293 | 0.32408 | 0.30579 |
| Example 2 | Baked | 0.50750 | 0.42711 | 0.37324 | 0.32477 | 0.30579 |
| Example 3 | Baked | 0.50750 | 0.42630 | 0.37293 | 0.32454 | 0.30558 |
| Example 4[1] | Baked + 1 cycle | 0.50808 | 0.42549 | 0.37263 | 0.32454 | 0.30538 |
| Example 5[2] | Baked + 10 cycles | 0.50635 | 0.42630 | 0.37324 | 0.32477 | 0.30620 |

TABLE 2-continued

| Baking electrode | Interplanar spacing (nm) | | | | |
|---|---|---|---|---|---|
| | [200] planes | [002] planes | [102] planes | [211] planes | [112] planes |
| Comparative Example 1 | Not baked | 0.51040 | 0.42874 | 0.37762 | 0.32758 | 0.30785 |

[1] Electrode of Example 1 that underwent one charge- discharge cycle
[2] Electrode of Example 1 that underwent ten charge- discharge cycles The present application claims priority on the basis of the Japanese Patent Application No. 2012-96854 filed on Apr. 20, 2012, the entire contents of which are incorporated herein by reference.

What is claimed is:

1. An electrode active material comprising a layered composition including:
 organic backbone layers containing an aromatic compound that is a dicarboxylic acid anion having two or more aromatic ring structures; and
 alkali metal element layers containing an alkali metal element coordinated to oxygen contained in the carboxylic acid anion to form a backbone,
 wherein the aromatic compound contained in the organic backbone layers has a naphthalene backbone, and
 wherein the layered composition has an interplanar spacing between (002) planes of 0.42400 to 0.42800 nm, an interplanar spacing between (102) planes of 0.37000 to 0.37600 nm, an interplanar spacing between (211) planes of 0.32250 to 0.32650 nm, and an interplanar spacing between (112) planes of 0.30400 to 0.30700 nm, as measured by X-ray diffraction.

2. The electrode active material according to claim 1, wherein the layered composition has an interplanar spacing between (200) planes of 0.50500 to 0.50950 nm as measured by X-ray diffraction.

3. The electrode active material according to claim 1, wherein the layered composition has an interplanar spacing between (200) planes of 0.50635 to 0.50866 nm as measured by X-ray diffraction.

4. The electrode active material according to claim 1, wherein the layered composition has an interplanar spacing between (002) planes of 0.42549 to 0.42711 nm, an interplanar spacing between (102) planes of 0.37263 to 0.37324 nm, an interplanar spacing between (211) planes of 0.32408 to 0.32477 nm, and an interplanar spacing between (112) planes of 0.30538 to 0.30620 nm, as measured by X-ray diffraction.

5. The electrode active material according to claim 1, wherein the layered composition is formed in layers by π-electron interaction of the aromatic compound and has a monoclinic crystal structure belonging to the space group $P2_1/c$.

6. The electrode active material according to claim 1, wherein the layered composition has a structure of formula (1), where four oxygen atoms from different dicarboxylic acid anions form four coordination bonds with the alkali metal element:

[Chem. 1]

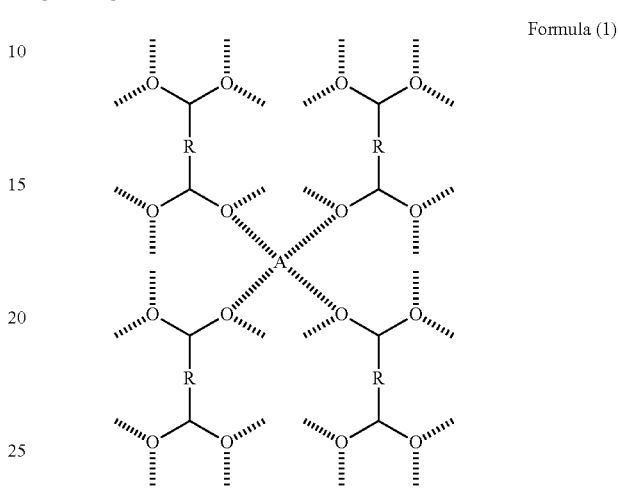

Formula (1)

(wherein R is a naphthalene backbone structure, and A is an alkali metal element).

7. The electrode active material according to claim 1, wherein the alkali metal element contained in the alkali metal element layers is Li.

8. The electrode active material according to claim 1, wherein the layered composition is a negative electrode active material.

9. A nonaqueous secondary battery electrode comprising the electrode active material according to claim 1.

10. The nonaqueous secondary battery electrode according to claim 9, wherein the nonaqueous secondary battery electrode is formed by providing an electrode mixture containing a layered composition and a conductor on a collector and baking the electrode mixture in a temperature range of 250° C. to 450° C. in an inert atmosphere, the layered composition including organic backbone layers containing an aromatic compound that is a dicarboxylic acid anion having a naphthalene backbone and alkali metal element layers containing an alkali metal element coordinated to oxygen contained in the carboxylic acid anion to form a backbone.

11. A nonaqueous secondary battery comprising:
 the nonaqueous secondary battery electrode according to claim 9; and
 an ion-conducting medium that conducts alkali metal ions.

* * * * *